(12) United States Patent
Takahashi et al.

(10) Patent No.: US 6,597,502 B2
(45) Date of Patent: *Jul. 22, 2003

(54) REAR PROJECTION SCREEN WITH UNIFORMITY OF LUMINANCE

(75) Inventors: Yoshiki Takahashi, Shinjuku-Ku (JP); Masahiro Goto, Shinjuku-Ku (JP); Hitomu Watanabe, Shinjuku-Ku (JP); Makoto Honda, Shinjuku-Ku (JP); Kumpei Oda, Shinjuku-Ku (JP); Katsunori Takahashi, Shinjuku-Ku (JP)

(73) Assignee: Dai Nippon Printing Co., Ltd. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/922,778

(22) Filed: Aug. 7, 2001

(65) Prior Publication Data

US 2001/0050812 A1 Dec. 13, 2001

Related U.S. Application Data

(63) Continuation of application No. 09/253,533, filed on Feb. 22, 1999, now Pat. No. 6,292,294.

(30) Foreign Application Priority Data

Feb. 23, 1998 (JP) .............................. 10-40343

(51) Int. Cl.$^7$ .............................................. G03B 21/60
(52) U.S. Cl. ....................................................... 359/456
(58) Field of Search ................... 359/443, 455, 359/456, 457, 619, 628, 625; 362/331, 333, 335, 336, 351, 355

(56) References Cited

U.S. PATENT DOCUMENTS

| | | | | |
|---|---|---|---|---|
| 2,207,835 A | | 7/1940 | Sukumlyn | 88/24 |
| 2,358,070 A | | 9/1944 | Holmes et al. | 88/28.9 |
| 2,881,686 A | | 4/1959 | Rühle | 95/44 |
| 3,357,772 A | | 12/1967 | Rowland | 350/167 |
| 3,791,712 A | | 2/1974 | Miyagi | 350/128 |
| 4,054,907 A | * | 10/1977 | Itoh et al. | 359/456 |
| 4,374,609 A | | 2/1983 | Lange | 350/128 |
| 4,387,959 A | | 6/1983 | Lange et al. | 350/128 |
| 4,509,823 A | | 4/1985 | Moriguchi et al. | 350/128 |
| 4,531,812 A | | 7/1985 | Oguino | 350/128 |
| 5,121,252 A | * | 6/1992 | Okada et al. | 359/455 |
| 5,186,780 A | | 2/1993 | Sakunaga et al. | 156/167 |
| 5,485,308 A | * | 1/1996 | Hirata et al. | 359/457 |
| 5,812,322 A | | 9/1998 | Meyers | 359/621 |
| 5,870,225 A | | 2/1999 | Ogino et al. | 359/457 |
| 6,101,031 A | | 8/2000 | Yoshimura et al. | 359/456 |

* cited by examiner

Primary Examiner—Christopher Mahoney
(74) Attorney, Agent, or Firm—Parkhurst & Wendel, L.L.P.

(57) ABSTRACT

A rear projection screen including a Fresnel lens sheet arranged on the projection side, and a lenticular lens sheet arranged on the observation side. The Fresnel lens sheet has a lenticular lens for vertical diffusion on its light-entering side. The lenticular lens for vertical diffusion contains a plurality of convex lenses that extend horizontally, and these plural convex lenses are arranged with a constant pitch. Further, the diffusion angle of the lenticular lens for vertical diffusion continuously increases, and, at the same time, the direction of diffusion is gradually inclined to the central part side as the distance from the central part toward each of the edges on the screen surface increases. The diffusion properties (the angle and direction of diffusion) of the lenticular lens thus continuously vary between the central part and edges of the screen surface.

4 Claims, 11 Drawing Sheets

REAR PROJECTION SCREEN WITH UNIFORMITY OF LUMINANCE

This application is a continuation of application Ser. No. 09/253,533 filed on Feb. 22, 1999 now U.S. Pat. No. 6,292,294.

BACKGROUND OF THE INVENTION

1. Field of the Invention

The present invention relates to a rear projection screen comprising a Fresnel lens and a lenticular lens.

2. Related Art

Rear projection screens that comprise Fresnel lenses for refracting rays projected from an imaging source to make them almost parallel with each other, and lenticular lenses for scattering projected rays to form an image have conventionally been known as screens useful for rear projection type TVs and the like.

Further, among the conventional rear projection screens, there has been known a screen in which projected rays are diffused in the horizontal direction by a lenticular lens sheet for horizontal diffusion, and in the vertical direction by both a diffuser and a lenticular lens sheet for vertical diffusion. It is noted that the diffusion angles of these lenticular lens sheets are generally uniform over the entire screen surface.

In the conventional rear projection screens, the diffusion angle is uniform over the entire screen surface, so that there is such a problem that the phenomenon of shading, which will be described hereinafter, tends to occur.

FIGS. 12A, 12B and 12C are views for illustrating the phenomenon of shading that occurs on a rear projection screen. In these figures, FIG. 12A is a view showing how those rays projected from an imaging source 20 are observed on a rear projection screen 10. In this figure, the intensity and direction of diffusion at three points a, b and c on the rear projection screen 10 are indicated by the length and direction of an arrow, respectively. Further, FIGS. 12B and 12C respectively show the luminance distributions on the rear projection screen 10, obtainable by observing the screen from observation points p1 and p2.

As can be understood from FIGS. 12A and 12B, when the rear projection screen 10 is observed from the front (observation point p1), the luminance at the marginal part (edges a and c) of the rear projection screen 10 is lower than that at the central part b of the rear projection screen 10, so that the marginal part of the rear projection screen 10 is perceived as dark. Further, as can be known from FIGS. 12A and 12C, when the rear projection screen 10 is observed from a position (observation point p2) deviated from the position in front of the screen, the luminance at the edge a which is near the observation point p2 is highest, and this luminance gradually decreases as the distance from the edge a increases toward the central part b and then toward the edge which is at the opposite of the edge a. Therefore, those parts on the rear projection screen 10 which are apart from the observation point p2 are perceived as dark.

In such a rear projection screen 10, the diffusion angle in the vertical direction is generally set to be narrower than that in the horizontal direction. Therefore, the phenomenon of shading tends to occur in the vertical direction on the rear projection screen 10, and the brightness on the rear projection screen 10 has thus lacked uniformity.

A method in which the focal length of the Fresnel lens constituting the rear projection screen 10 is decreased has been known as a method for reducing the occurrence of such a shading phenomenon. By this method, the point of focus on the observation side of the Fresnel lens (i.e., the observation side of the rear projection screen 10) is made closer to the lens, so that, in FIG. 12A, a ray of light projected on the marginal part (edges a and c) of the rear projection screen 10 emerges by being inclined to the inside. For this reason, in this rear projection screen 10, increased luminance is observed on the marginal part (edges a and c) of the rear projection screen 10 when the screen is observed from the front (observation point p1). Moreover, even when the screen is observed from a position (observation point p2) deviated from the position in front of the screen, improved uniformity of brightness is attained on the rear projection screen 10 because decreased luminance is observed at the edge a which is near the observation point p2, while increased luminance is observed at the edge c which is apart from the observation point p2.

However, in such a rear projection screen 10, when the focal length of the Fresnel lens constituting the rear projection screen 10 is decreased, the difference among the exit angles of imaging rays of three colors projected from different positions on the imaging source 20 becomes large. When the difference in exit angle in terms of vertical direction against which the diffusion angle of the rear projection screen 10 has been set narrow becomes large, color shading tends to occur on the rear projection screen 10. When this color shading is taken into consideration, it is difficult to make the focal length of the rear projection screen 10 on the observation side shorter than approximately 10 m. Therefore, it has been impossible to reduce the occurrence of the shading phenomenon without bringing about color shading.

SUMMARY OF THE INVENTION

The present invention was accomplished in the light of the foregoing. An object of the present invention is therefore to provide a rear projection screen capable of attaining the uniformity of brightness over the entire screen surface without bringing about the the lowering of luminance on the marginal part of the screen surface, and the nonuniformity of luminance on the screen surface even when the screen is observed from a position deviated from the front.

The present invention is a rear projection screen comprising a Fresnel lens, and a lenticular lens, having diffusion properties that vary continuously between a central part and an edge of the screen surface.

In the present invention, the above-described lenticular lens is preferably such that its diffusion angle continuously increases as the distance from the central part toward the edge side on the screen surface increases and its direction of diffusion is gradually inclined to the central part side or to the edge side as the distance from the central part toward the edge side on the screen surface increases.

Further, it is preferred in the present invention that the above-described lenticular lens comprises a plurality of convex lenses and that the shapes of these plural convex lenses continuously vary as the position of the convex lens gets apart from the central part toward the edge on the screen surface. Specifically, it is preferable to make the heights of the above-described plural convex lenses continuously increase as the position of the convex lens gets apart from the central part toward the edges on the screen surface. Further, among the above described plural convex lenses, a convex lens arranged at the central part of the screen surface is preferably in such a shape that the deviation of the top of the convex lens from the center of the same is almost zero;

and it is preferable that this deviation of the top of the convex lens from the center of the same continuously increases as the position of the convex lens moves from the central part toward the edges on the screen surface. Furthermore, each convex lens described above has a cross section preferably in such a shape that two circular arcs with different radii are connected. Among the above-described plural convex lenses, a convex lens arranged at the central part of the screen surface is preferably in such a shape that the proportion of the circular arc with a larger radius is higher, and it is preferable that the proportion of the circular arc with a smaller radius increases continuously as the position of the convex lens moves from the central part side toward the edge side on the screen surface. Moreover, it is preferable that the above-described plural convex lenses be arranged with a constant pitch.

In the present invention, it is preferable that the above-described lenticular lens be for vertical diffusion.

According to the present invention, since the diffusion properties of the lenticular lens continuously vary with the distance from the central part toward the edges on the screen surface, it is possible to attain the uniformity of brightness over the entire screen surface without bringing about the lowering of luminance on the marginal part of the screen surface, and the nonuniformity of luminance on the screen surface even when the screen is observed from a position deviated from the front.

BRIEF DESCRIPTION OF THE DRAWINGS

By referring now to the accompanying drawings, preferred embodiments of the present invention will be described in detail.

In the drawings.

DETAILED DESCRIPTION OF THE PREFERRED EMBODIMENT

First of all, one embodiment of the rear projection screen according to the present invention will be described by referring to FIGS. 1 to 3.

Figure 1:
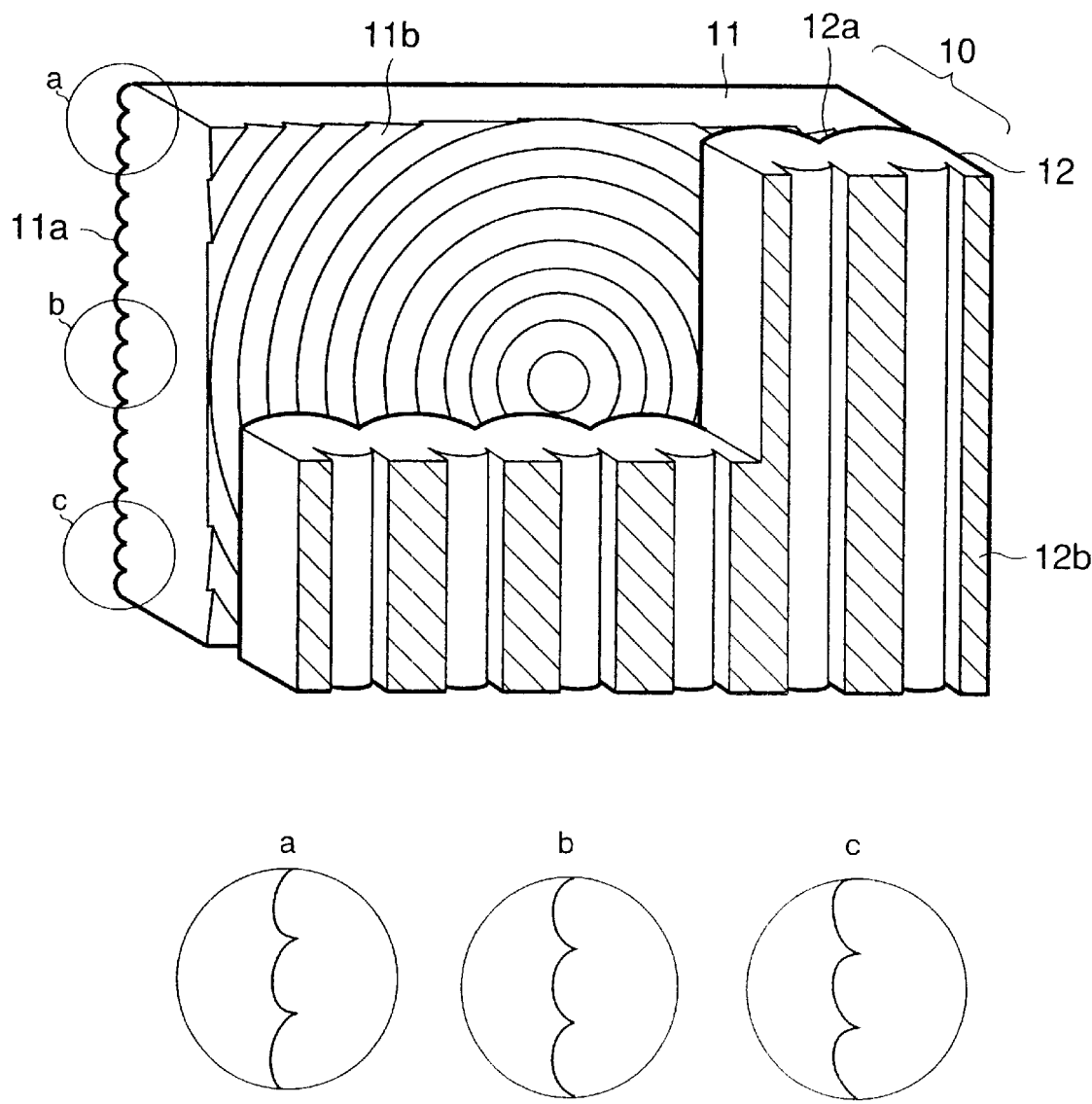
FIG. 1 is a view showing one embodiment of the rear projection screen according to the present invention.
Figure 2A:
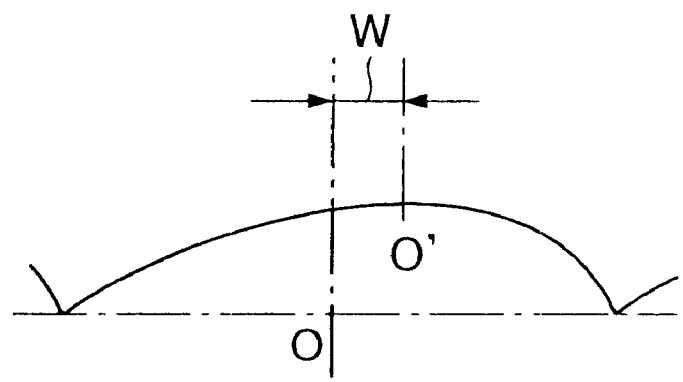
FIGS. 2A and 2B are views for illustrating one example of the shape of the lenticular lens for use in the rear projection screen shown in FIG. 1.

As shown in FIG. 1, a rear projection screen 10 comprises a Fresnel lens sheet 11 arranged on the projection side, and a lenticular lens sheet 12 arranged on the observation side. Rays projected from an imaging source (not shown in the figure) are made almost parallel to each other by the Fresnel lens sheet 11, and scattered in the vertical direction and in the horizontal direction by the Fresnel lens sheet 11 and the lenticular lens sheet 12, respectively, so that an image can be observed on the observation side of the rear projection screen 10.

The Fresnel lens sheet 11 has a lenticular lens 11a for vertical diffusion, formed on its light-entering side, and a circular Fresnel lens 11b formed on its light-emerging side. The lenticular lens sheet 12 has a lenticular lens 12a for horizontal diffusion, formed on its light-entering side, and black stripes 12b formed on its light-emerging side.

These Fresnel lens sheet 11 and lenticular lens sheet 12 are in the form of sheets or films. Further, a front panel sheet or the like may also be arranged on the observation side in addition to these Fresnel lens sheet 11 and lenticular lens sheet 12.

Next, the lenticular lens 11a for vertical diffusion, formed on the Fresnel lens sheet 11 in the rear projection screen 10 as shown in FIG. 1 will be described in detail.

As shown in FIG. 1, the lenticular lens 11a for vertical diffusion contains a plurality of convex lenses that extend in the horizontal direction, and these plural convex lenses are arranged with a constant pitch. The diffusion properties of the lenticular lens 11a for vertical diffusion continuously vary between the central part and edge of the screen surface. Specifically, the lenticular lens 11a for vertical diffusion is such that the diffusion angle thereof continuously increases as the distance from the central part toward the edge side on the screen surface increases and that the direction of diffusion is gradually inclined to the central part side or to the edge side as the distance from the central part toward the edge side on the screen surface increases.

In such a lenticular lens 11a for vertical diffusion, a method in which different shapes (curvatures, external shapes, etc.) are given to the convex lenses in the lenticular lens 11a for vertical diffusion can be used for varying the angle and direction of diffusion depending on the position on the screen surface.

Specifically, for instance, in the case where the diffusion angle is varied depending on the position on the screen surface, the diffusion angle can be increased continuously with increasing distance from the central part toward the edge side on the screen surface, by gradually increasing the heights of the convex lenses as the position of the convex lens moves from the central part side toward the edge side on the screen surface. A method in which the pitch of the convex lenses is changed while keeping their curvatures constant can be used for varying the angle of diffusion depending on the position on the screen surface. However, this method has such a shortcoming that a Moiré fringe tends to be formed between the convex lenses and the Fresnel lens 11b formed on the light-emerging side of the Fresnel lens sheet 11 because the pitch of the convex lenses is not constant.

Further, in the case where the direction of diffusion is varied depending on the position on the screen surface, the direction of diffusion can gradually be inclined to the central part side or to the edge side with increasing distance from the central part toward the edge side on the screen surface, by making the deviation W of the top O' of a convex lens arranged at the central part of the screen surface from the center O of the same (see FIG. 2A) almost zero, and by gradually increasing this deviation W as the position of the convex lens moves from the central part side toward the edge side on the screen surface.

Figure 2B:
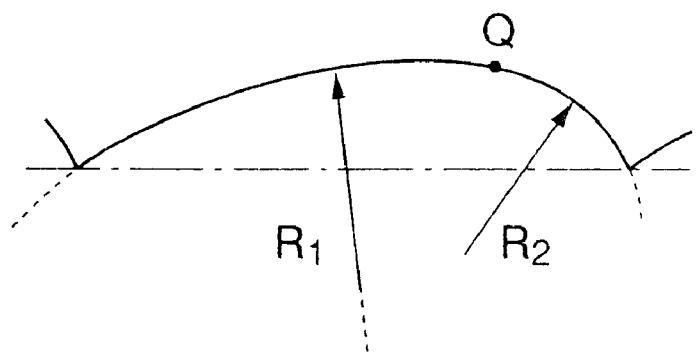

It is noted that the angle of diffusion can be increased continuously, and, at the same time, the direction of diffusion can gradually be inclined to the central part side or to the edge side as the distance from the central part toward the edge side on the screen surface increases, by allowing each convex lens to have a cross section in such a shape that two circular arcs (larger circular arc (radius $R_1$), smaller circular arc (radius $R_2$)) with different radii are smoothly connected as shown in FIG. 2B (Q: connection point), and by making the proportion of the larger circular arc in a convex lens arranged at the central part of the screen surface higher and gradually increasing the proportion of the smaller circular arc as the position of the convex lens gets apart from the central part toward the edge side on the screen surface. In this case, it is preferable to make both the radius $R_1$ of the larger circular arc and the diameter $2 \times R_2$ of the smaller circular arc larger than the pitch of the convex lenses.

Such a lenticular lens 11a for vertical diffusion can be made by means of molding using a metal mold that has shapes equivalent to the shapes of the convex lenses. Such a metal mold can be obtained by means of surface grinding or by processing using lathe.

Figure 3:
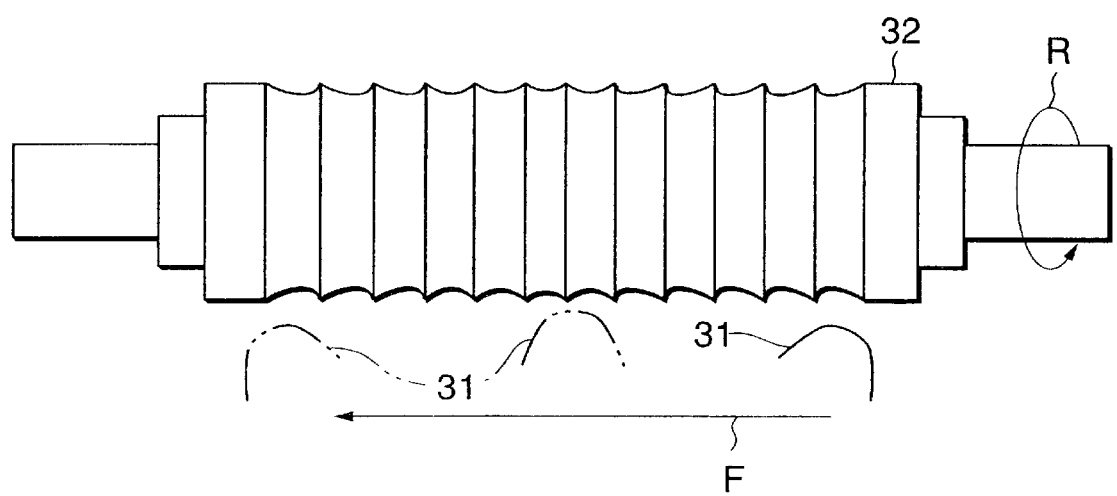
FIG. 3 is a view for illustrating a process for producing a metal mold that is used for producing a lenticular lens.

FIG. 3 is a view for illustrating a process for producing a metal mold used for obtaining a lenticular lens for vertical diffusion. As shown in FIG. 3, in the case where a metal mold 32 is produced by processing using a lathe, a cutting tool whose cross section is in such a shape that one or more circular or elliptical arcs are smoothly connected with straight lines is prepared as a cutting tool 31 for processing. Specifically, the cross section of the cutting tool 31 is in such a shape that the corners of an almost trapezoidal shape which is bilaterally symmetrical in terms of its central axis have been made round and that one side of this almost trapezoidal shape agrees with the shape of the cross section shown in FIG. 2A or 2B.

The cutting tool 31 having such a cross-sectional shape is fixed on a tool slide whose angle can freely be set by means of numerical control (see Japanese Patent Laid-Open Publications No. 124801/1987, No. 40107/1995 and No. 241919/1995). By feeding the cutting tool 31 in the direction indicated by the arrow F with a constant pitch along a cylindrical object to be cut, with the object to be cut being rotated in the direction indicated by the arrow R, and by cutting the object while changing the angle of the cutting tool 31 with the object (cutting edge angle) within ±45° for every pitch, a cylindrical metal mold 32 which will be a master for the lenticular lens 11a for vertical diffusion can be made.

When a thermoplastic resin is molded by means of melt extrusion using the metal mold 32 thus produced, or when an ionizing-radiation-curable resin which is curable with ionizing radiation such as ultraviolet light or electron beams is subjected to ionizing radiation curing molding using the metal mold 32, a lenticular lens 11a for vertical diffusion whose diffusion properties continuously vary between the central part and edge of the screen surface can be obtained.

According to this embodiment, since the diffusion properties (the angle and direction of diffusion) of the lenticular lens 11a for vertical diffusion continuously vary with the distance from the central part toward the edge side on the screen surface, increased luminance is observed on the marginal part (edges a and c) of the rear projection screen 10 when the screen is observed from the front (observation point p1), and, even when the screen is observed from a position (observation point p2) deviated from the front, increased luminance is observed at the edge c which is apart from the observation point p2, while decreased luminance is observed at the edge a which is near the observation point p2. For this reason, it is possible to attain the uniformity of brightness over the entire screen surface without bringing about the lowering of luminance on the marginal part of the screen surface, and the nonuniformity of luminance on the screen surface even when the screen is observed from a position deviated from the position in front of the screen.

ANOTHER EMBODIMENT

In the embodiment shown in FIGS. 1 to 3, a lenticular lens for vertical diffusion is formed on a Fresnel lens sheet. However, it is also possible, as shown in FIGS. 4 and 5, to form a lenticular lens for vertical diffusion either on a lenticular lens sheet or on a front panel sheet that is provided on the observation side.

Figure 4:
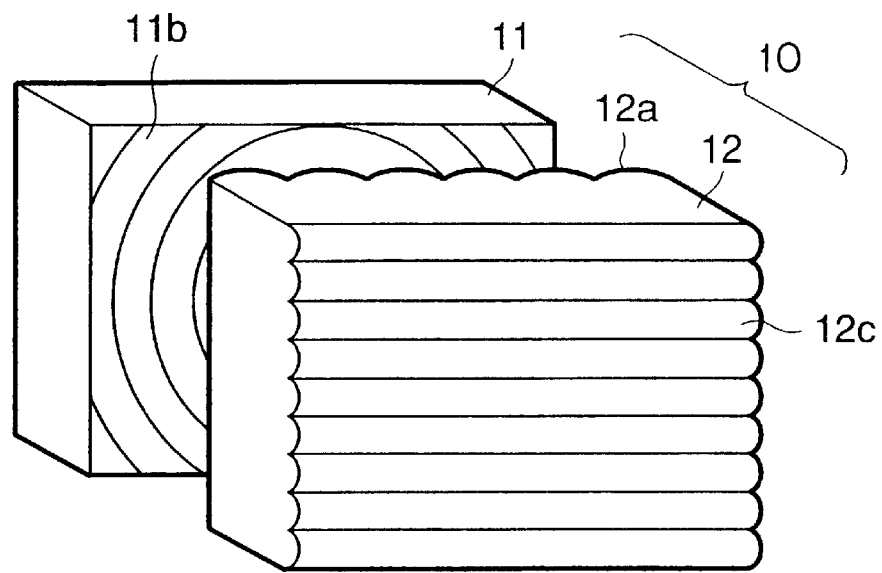
FIGS. 4 and 5 are views for showing other embodiments of the rear projection screen according to the present invention.

FIG. 4 is a view showing an embodiment in which a lenticular lens for vertical diffusion is formed on a lenticular lens sheet. As shown in FIG. 4, a rear projection screen 10 contains a Fresnel lens sheet 11 and a lenticular lens sheet 12. The Fresnel lens sheet 11 has a circular Fresnel lens 11b formed on its light-emerging side. The lenticular lens sheet 12 has a lenticular lens 12a for horizontal diffusion formed on its light-entering side, and a lenticular lens 12c for vertical diffusion formed on its light-emerging side. Like the lenticular lens 11a for vertical diffusion in the embodiment as shown in FIGS. 1 to 3, the lenticular lens 12c for vertical diffusion has diffusion properties (the angle and direction of diffusion) which vary continuously with the distance from the central part toward the edge side on the screen surface.

Figure 5:
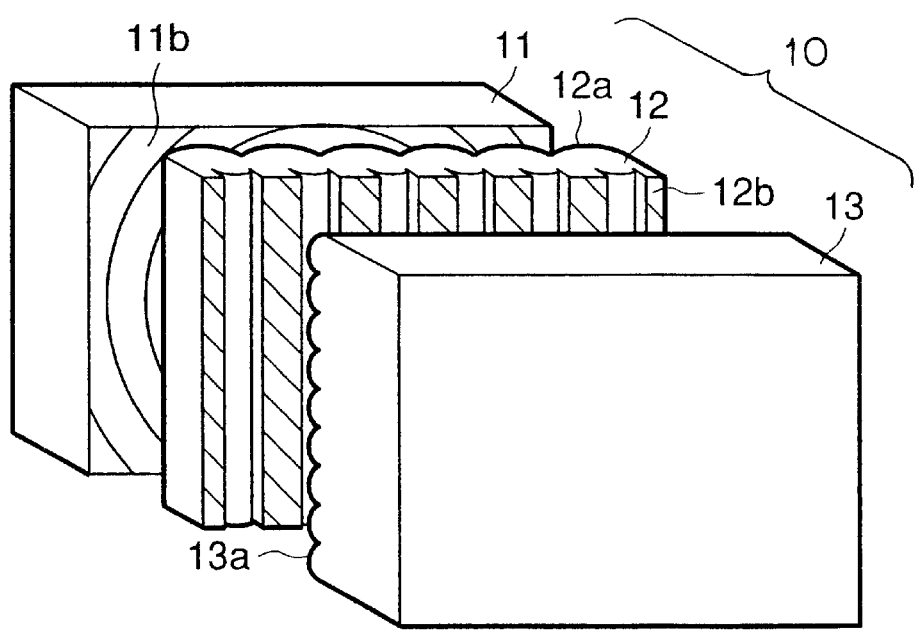

FIG. 5 is a view showing an embodiment in which a lenticular lens for vertical diffusion is formed on a front panel sheet provided on the observation side. As shown in FIG. 5, a rear projection screen 10 contains a Fresnel lens sheet 11, a lenticular lens sheet 12, and a front panel sheet 13. The Fresnel lens sheet 11 has a circular Fresnel lens 11b formed on its light-emerging side. The lenticular lens sheet 12 has a lenticular lens 12a for horizontal diffusion, formed on its light-entering side, and black stripes 12b formed on its light-emerging side. Further, the front panel sheet 13 has a lenticular lens 13a for vertical diffusion, formed on its light-entering side. The diffusion properties (the angle and direction of diffusion) of this lenticular lens 13a for vertical diffusion vary continuously with the distance from the central part toward the edge side on the screen surface like those of the lenticular lens 11a for vertical diffusion in the embodiment as shown in FIGS. 1 to 3.

EXAMPLE

Specific examples of the embodiment shown in FIGS. 1 to 3 will now be described hereinafter.

Example 1

In this example, a rear projection screen 10 as shown in FIG. 1 was produced as a rear projection screen for a 60 inch rear projection type television. In a Fresnel lens sheet 11 for use in this rear projection screen, a lenticular lens 11a for vertical diffusion is formed on the light-entering side of the screen, and a circular Fresnel lens 11b is formed on the light-emerging side of the screen.

Regarding a metal mold used for making the lenticular lens 11a for vertical diffusion, a cylindrical metal mold 32 which would be a master for the lenticular lens 11a for vertical diffusion was produced by the use of a cutting tool 31 whose cross section was in such a shape that three circular arcs were smoothly connected. Specifically, as shown in FIG. 3, by feeding with a constant pitch the cutting tool 31 in the direction indicated by the arrow F along a cylindrical object to be cut, with the object to be cut being rotated in the direction indicated by the arrow R, and by cutting the object while changing the cutting edge angle of the cutting tool 31 with the object at a predetermined degree angle for every pitch, the cylindrical metal mold 32 was produced. The cross section of the cutting tool 31 was made into such a shape that two smaller circular arcs, each having a radius $R_2$ of 0.2 mm were respectively connected to both sides of a larger circular arc having a radius $R_1$ of 0.5 mm and that one side of the cross section agreed with the shape of the cross section shown in FIG. 2B.

The metal mold 32 thus produced, and a cylindrical metal mold whose surface had been provided with a circular Fresnel lens pattern by means of cutting were juxtaposed, and a polymethylmethacrylate resin was melt-extruded through these metal molds, thereby making the Fresnel lens sheet 11 having the lenticular lens 11a for vertical diffusion and the circular Fresnel lens 11b.

As shown in FIG. 1, the lenticular lens 11a for vertical diffusion on the Fresnel lens sheet 11 thus produced is such that the heights of convex lenses arranged at the upper edge a and lower edge c, which are in the marginal part of the screen surface, are higher than the height of a convex lens arranged at the central part b and that the top of the convex lens arranged at the upper edge a and that of the convex lens arranged at the lower edge c are deviated from the center of the respective convex lenses toward the central part side on the screen surface. By this, the diffusion angles at the upper edge a and lower edge c, which are in the marginal part of the screen surface, become wider than the diffusion angle at the central part b, and, at the same time, the directions of diffusion at the upper edge a and lower edge c are to be inclined to the central part side on the screen surface.

Figure 6A:
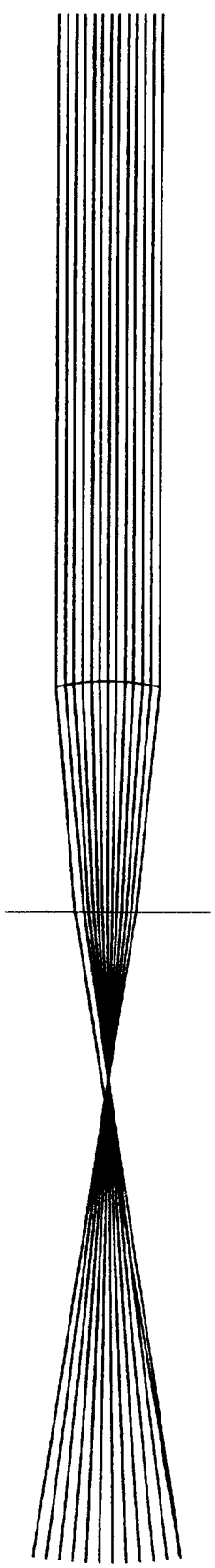
FIGS. 6A and 6B are ray tracing charts respectively obtained at the upper edge and central part of the lenticular lens in one example of the rear projection screen shown in FIG. 1.
Figure 6B:
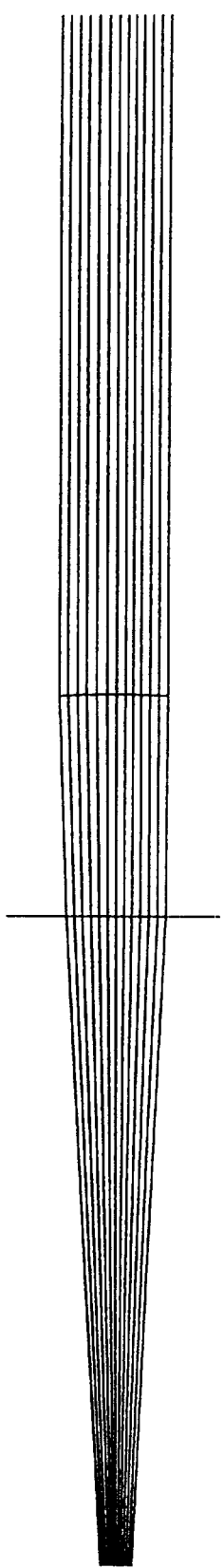
Figure 7:
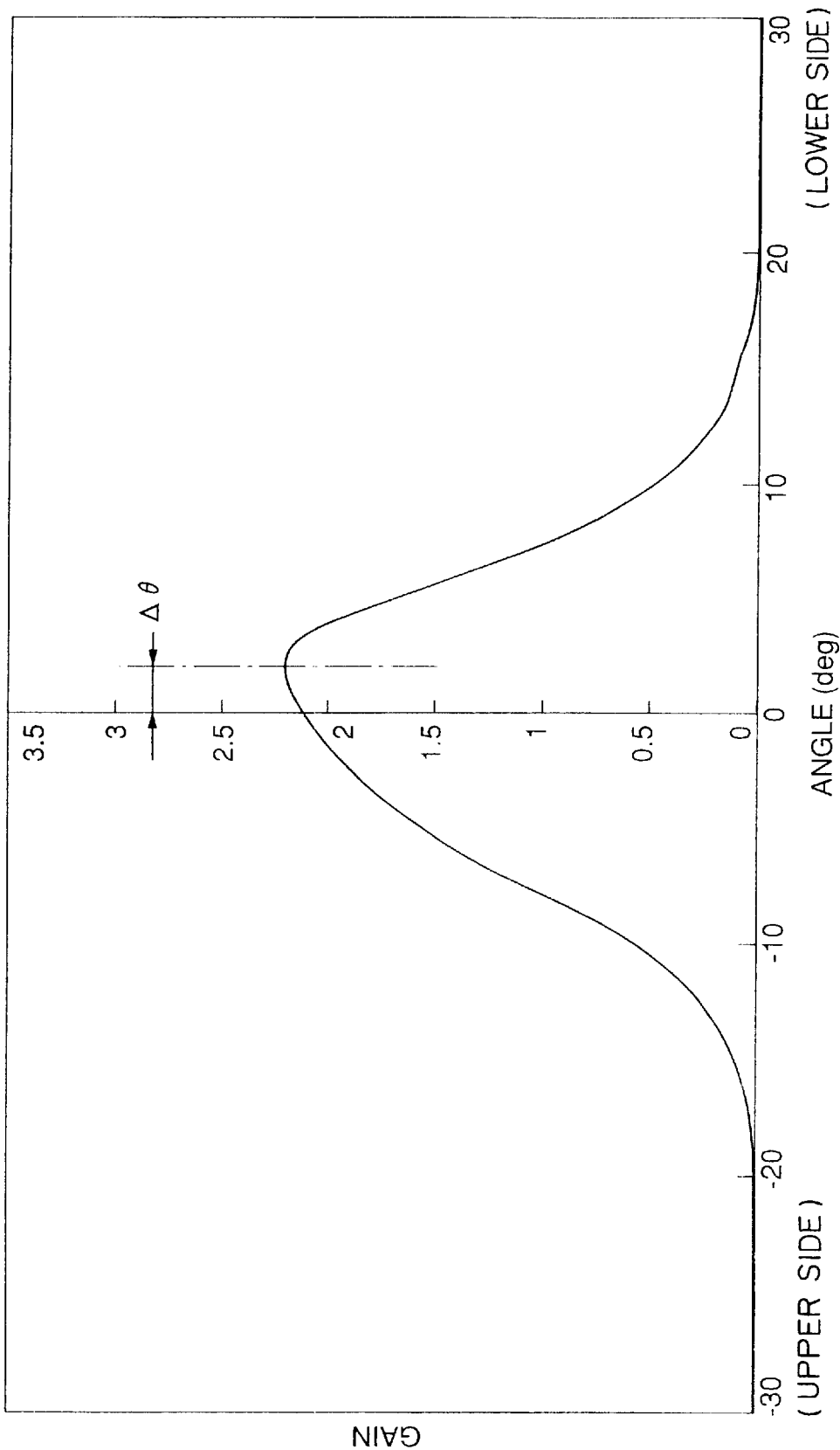
FIGS. 7, 8 and 9 are diagrams respectively showing the diffusion properties at the upper edge, central part and lower edge of the lenticular lens in one example of the rear projection screen shown in FIG. 1.
Figure 8:
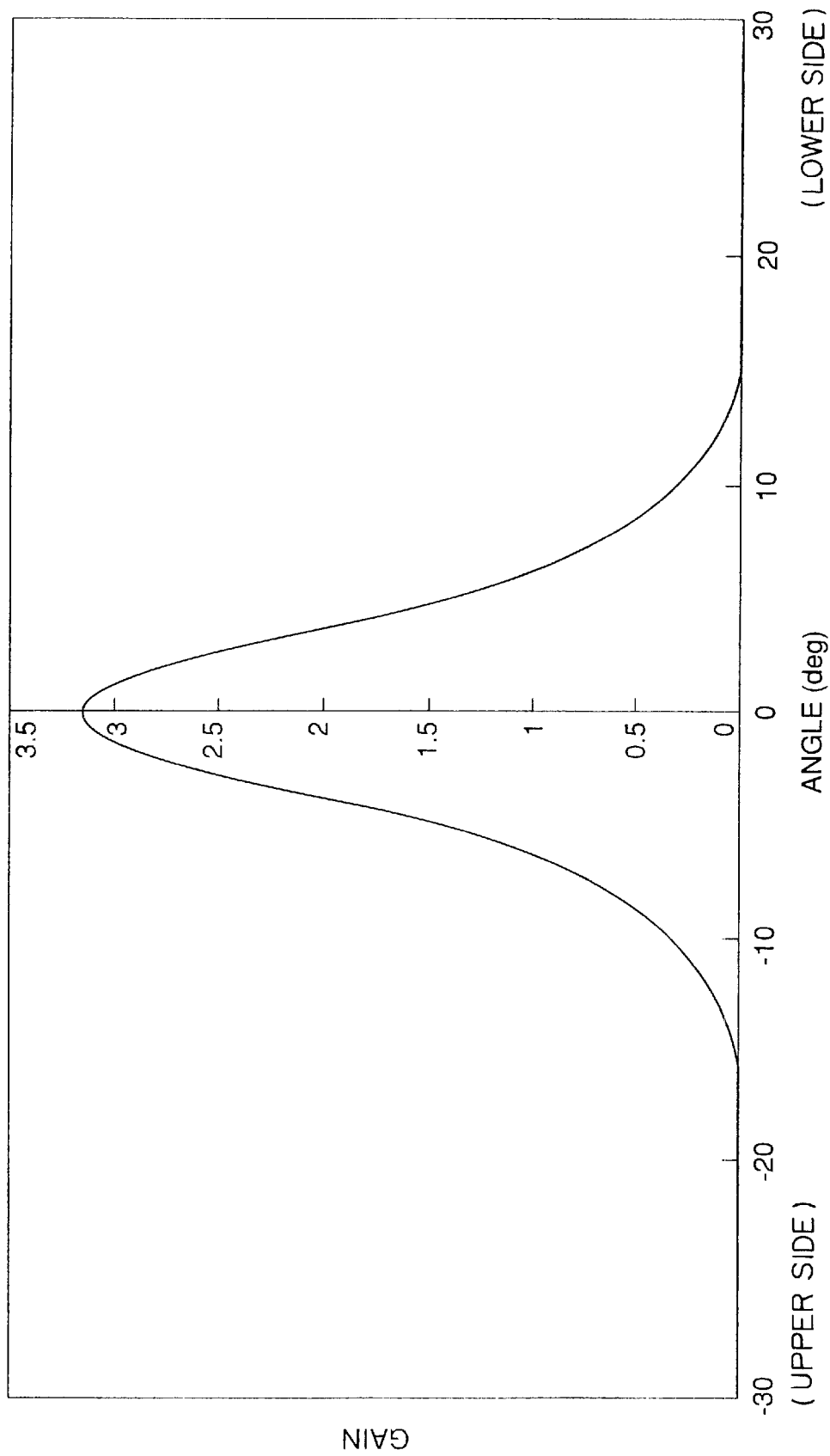
Figure 9:
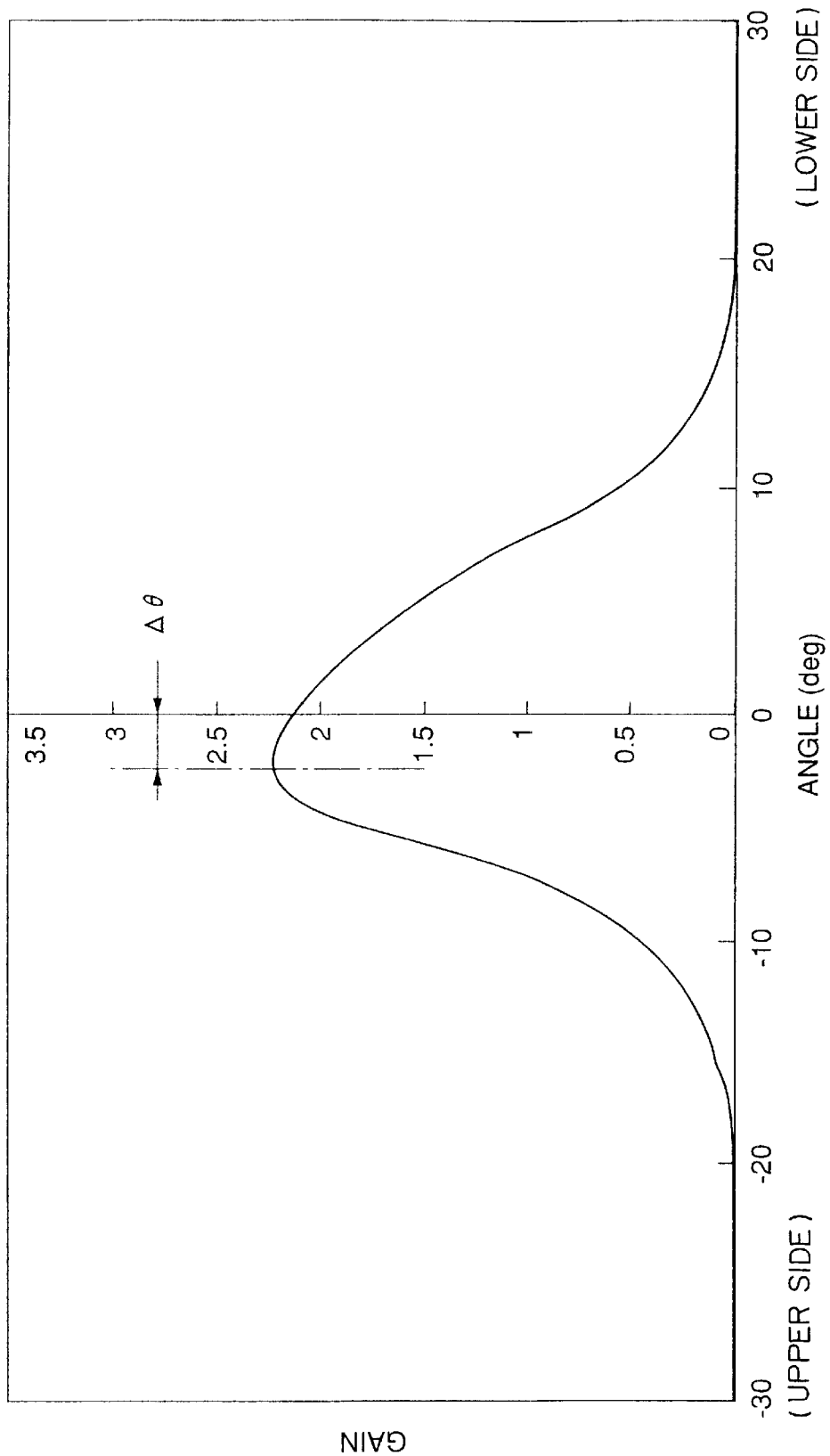

FIGS. 6A and 6B are ray tracing charts respectively obtained at the upper edge and central part of the lenticular lens 11a for vertical diffusion. Further, FIGS. 7, 8 and 9 are diagrams respectively showing the diffusion properties obtainable at the upper edge, central part and lower edge of the lenticular lens 11a for vertical diffusion. In FIGS. 7, 8 and 9, the angle (deg) of the horizontal axis represents the direction of diffusion (−:upper side, +:lower side), and the shift of the peak of the diffusion properties corresponds to the inclination of the direction of diffusion at the upper edge a or lower edge c which is in the marginal part of the screen surface.

Next, the results of the measurement of the luminance properties of the thus-produced rear projection screen 10 having the Fresnel lens sheet 11 and the lenticular lens sheet 12 will be described.

Figure 10A:
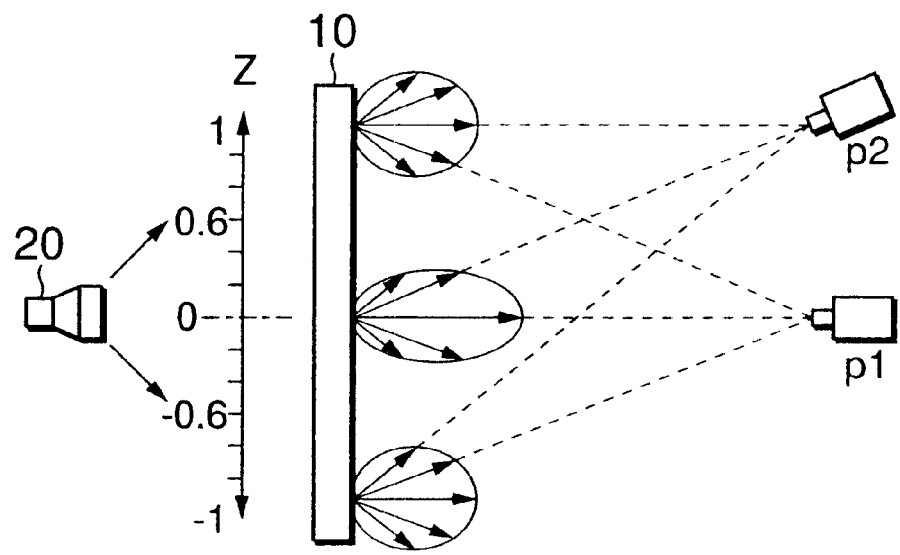
FIGS. 10A and 10B are views for respectively showing how those rays projected from an imaging source are observed on the rear projection screens of Examples 1, 2 and on a conventional rear projection screen.
Figure 10B:
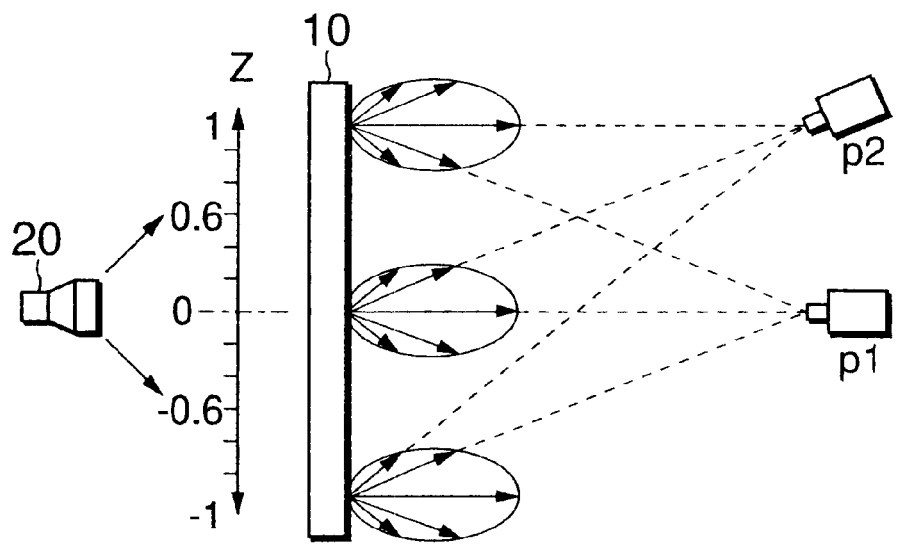
Figure 11A:
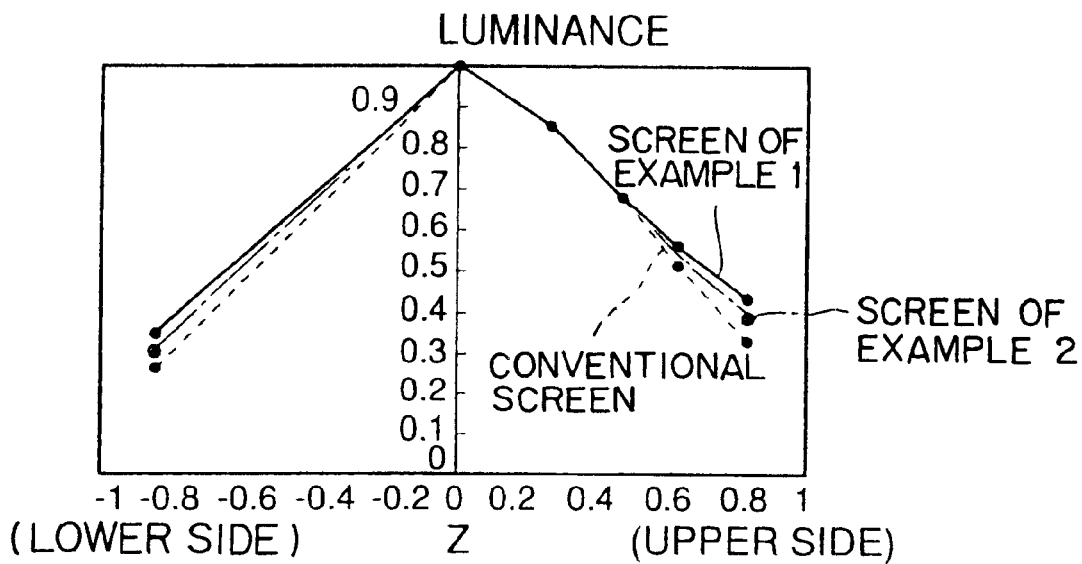
FIGS. 11A and 11B are graphs respectively showing the results of the measurement of luminance properties carried out in terms of the rear projection screen of Examples 1, 2 and a conventional rear projection screen.
Figure 11B:
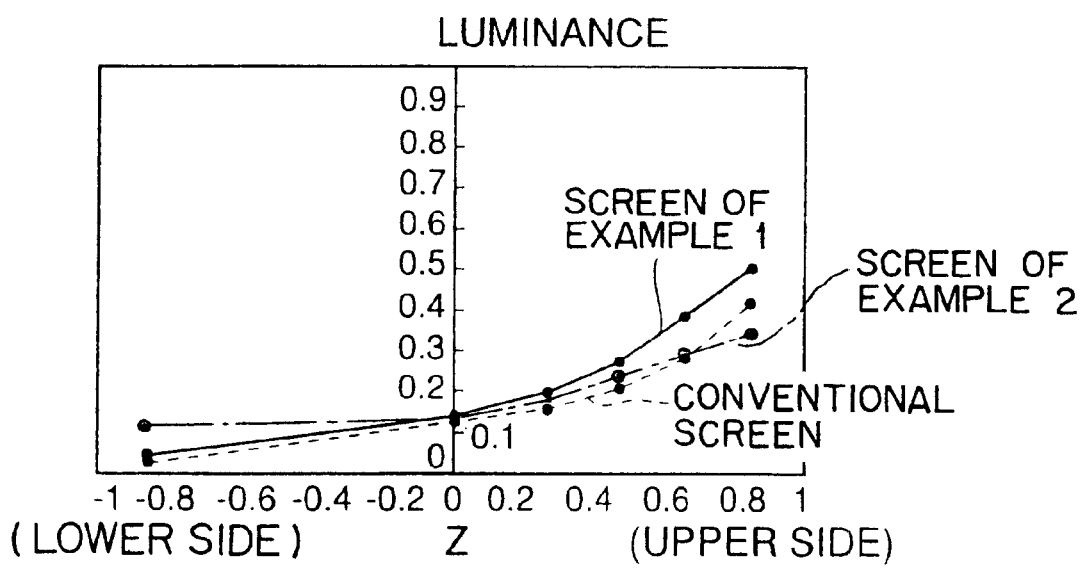
Figure 12A:
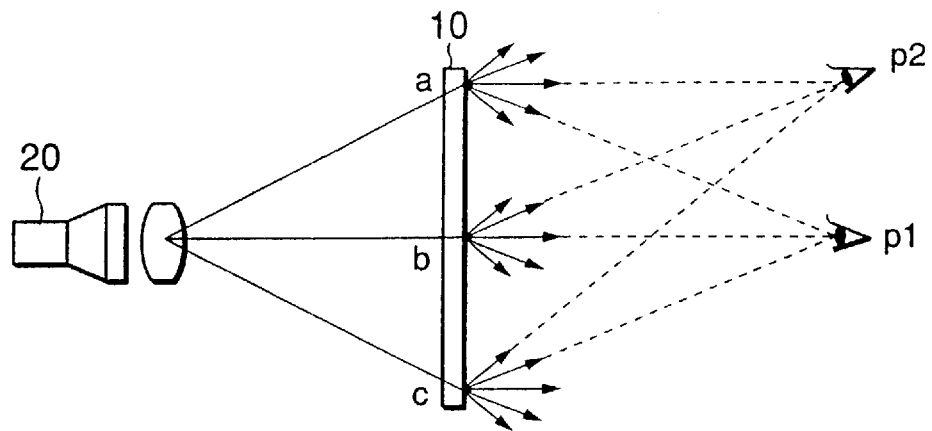
FIGS. 12A, 12B and 12C are views for illustrating the phenomenon of shading which occurs on a rear projection screen.
Figure 12B:
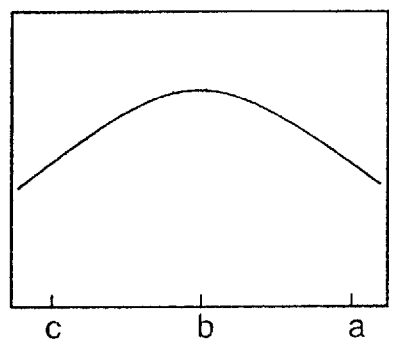
Figure 12C:
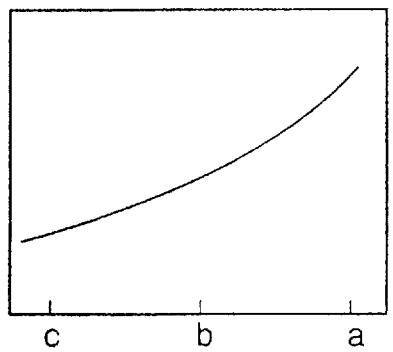

FIGS. 10A and 10B are views respectively showing how those rays projected from an imaging source 20 are observed on the rear projection screen 10 of this example and on a conventional rear projection screen 10. In these figures, the intensity and direction of diffusion at three points on the rear projection screen 10 are indicated by the length and direction of an arrow, respectively. Further, FIGS. 11A and 11B are graphs respectively showing the luminance distributions obtained from the position in front of the rear projection screen 10, three meters apart from the same (measurement point p1), and from the stand-viewing position which is 60 cm above the measurement point p1 (measurement point p2).

A case where the rear projection screen 10 is observed from the front (measurement point p1) will firstly be described.

As can be understood from FIG. 10B, the intensity and direction of diffusion at the upper edge, central part and lower edge of the screen surface are uniform in the conventional rear projection screen 10. Therefore, when the rear projection screen 10 is observed from the front (measurement point p1), a ray of light emerging from the central part of the screen surface appears to have the highest intensity, while rays emerging from the upper edge and lower edge of the screen surface appear to have lower intensities. For this reason, the luminance on the marginal part of the rear projection screen 10 is observed to be lower than the luminance on the central part of the rear projection screen 10 (see FIG. 11A).

In the rear projection screen 10 of this example, the luminance at the upper edge and the one at the lower edge are observed to be lower than the luminance on the central part of the screen surface like in the case of the conventional rear projection screen 10. However, as can be understood from FIG. 10A, since the diffusion angles at the upper edge and lower edge of the screen surface are wider, and the directions of diffusion at these points are inclined to the central part (see FIG. 10A), the lowering of luminance is smaller than that in the conventional rear projection screen 10 (see FIG. 11A).

Next, a case where the rear projection screen 10 is observed from the stand-viewing position (measurement point p2) will be described.

In the conventional rear projection screen 10, the intensity and direction of diffusion at the upper edge, central part and lower edge of the screen surface are uniform as can be understood from FIG. 10B. Therefore, when the rear projection screen 10 is observed from the stand-viewing position (measurement point p2), the luminance at the upper edge of the screen surface appears to be highest, and gradually decreases as the position on the screen surface gets apart from the upper edge toward the central part and then toward the lower edge of the screen surface (see FIG. 11B).

On the contrary, in the rear projection screen 10 of this example, although the luminance at the upper edge of the screen surface appears to be highest and gradually decreases as the position on the screen surface gets apart from the upper edge toward the central part and then toward the lower edge of the screen surface like in the case of the conventional rear projection screen 10, the lowering of luminance is smaller than that in the conventional rear projection screen 10 (see FIG. 11B). This is because, as can be understood from FIG. 10A, the diffusion angles at the upper edge and lower edge of the screen surface are wider, and the directions of diffusion at these points are inclined to the central part (see FIG. 10A).

Example 2

The rear projection screen of Example 2 is essentially identical to that of Example 1 except that the tops of the convex lenses arranged at the upper edge and lower edge, which are in the marginal part of the screen surface, are deviated from the center of the respective convex lenses toward the edge side on the screen surface; and so that the directions of diffusion at the upper edge and lower edge are to be inclined to the edge side on the screen surface.

In this example, since the direction of deviation of the tops of the convex lenses is opposite to that of Example 1 while the shapes of the convex lenses are identical to those of Example 1, the diffusion properties obtainable at the upper edge, central part and lower edge of the lenticular lens for vertical diffusion, respectively correspond to FIGS. 9, 8, and 7, in reverse order to the case of Example 1.

When the rear projection screen 10 of this example is observed from the front (measurement point p1), as can be understood from the comparison of FIGS. 9 and 8, and FIGS. 7 and 8, the luminance on the upper edge and lower edge of the screen surface is observed to be lower than the luminance on the central part of the screen surface. However, the diffusion angles at the upper edge and lower edge of the screen surface are wider, and the luminance on the upper edge or lower edge in terms of the direction to the central part is increased. Therefore, even when the direction of diffusion can gradually be inclined to the edge side with increasing distance from the central part toward the edge side on the screen surface, the lowering of luminance is smaller than that in the conventional rear projection screen 10 (see FIG. 11A).

Further, when the rear projection screen 10 is observed from the stand-viewing position (measurement point p2), the luminance at the upper edge of the screen surface appears to be highest, and gradually decreases as the position on the screen surface moves from the upper edge toward the central part and then toward the lower edge of the screen surface. However, since the diffusion angles at the upper edge and lower edge of the screen surface are wider, and the luminance on the upper edge or lower edge in terms of the direction to the central part is increased, the lowering of luminance is smaller than that in the conventional rear projection screen 10 (see FIG. 11B).

In this example, since the directions of diffusion at the upper edge and lower edge are to be inclined to the edge side on the screen surface, the preferable change of luminance caused by the increase of the diffusion angles at the upper edge and lower edge of the screen surface is slightly decreased. However, the rear projection screen of this example can be suitably used as a screen capable of controlling the extreme change of luminance and attaining the uniformity of luminance between the front (measurement point p1) and the stand-viewing point (measurement point p2), at some cost of degrading the luminance at the upper edge and lower edge of the screen surface.

What is claimed is:

1. A rear projection screen comprising:

a Fresnel lens; and a lenticular lens for vertical diffusion, said lenticular lens containing a plurality of convex lenses arranged with a constant pitch, wherein said lenticular lens has a central part and a pair of opposing upper and lower edges of the screen surface; and a direction of diffusion at the lenticular lens is gradually inclined to the central part or to each of the opposing upper and lower edges as a distance from the central part toward each of the opposing upper and lower edges on the screen surface increases.

2. The rear projection screen according to claim 1, wherein a convex lens, among the plural convex lenses, arranged at the central part of the screen surface is in such a shape that the deviation of the top of the convex lens from the center of the same is zero, and this deviation of the top of the convex lens from the center of the same continuously increases as a distance from the central part toward each of the opposing upper and lower edges on the screen surface increases.

3. A rear projection screen comprising:

a Fresnel lens; and a lenticular lens for vertical diffusion, said lenticular lens containing a plurality of convex lenses arranged with a constant pitch, wherein said lenticular lens has a central part and a pair of opposing upper and lower edges of the screen surface; and a direction of diffusion at the lenticular lens is gradually inclined to the central part or to each of the opposing upper and lower edges, with a diffusion angle of the lenticular lens being continuously increasing, as a distance from the central part toward each of the opposing upper and lower edges on the screen surface increases.

4. The rear projection screen according to claim 3, wherein each convex lens has a cross section in such a shape that two circular arcs with different radii are connected; and, among the plural convex lenses, a convex lens arranged at the central part of the screen surface is in such a shape that the proportion of the circular arc with a larger radius is higher than the proportion of the circular arc with a smaller radius, and the proportion of the circular arc with the smaller radius continuously increases as a distance from the central part toward each of the opposing upper and lower edges on the screen surface increases.

\* \* \* \* \*